United States Patent
Elabd

Patent Number: 5,760,403
Date of Patent: Jun. 2, 1998

[54] HIGH MODULATION TRANSFER FUNCTION CCD X-RAY IMAGE SENSOR APPARATUS AND METHOD

[75] Inventor: Hammam Elabd, Sunnyvale, Calif.

[73] Assignee: Loral Fairchild Corp., Syosset, N.Y.

[21] Appl. No.: 634,680

[22] Filed: Apr. 18, 1996

[51] Int. Cl.$^6$ .............. G01M 11/00; G01T 1/20; G01T 1/24
[52] U.S. Cl. .............. 250/370.11; 250/370.09; 378/98.8
[58] Field of Search .............. 250/370.11, 370.09; 378/98.8, 207

[56] References Cited

U.S. PATENT DOCUMENTS

| | | | |
|---|---|---|---|
| 3,980,819 | 9/1976 | Schwartz | 178/7.5 |
| 4,074,231 | 2/1978 | Yajima et al. | 340/146.3 |
| 4,238,772 | 12/1980 | von Gierke et al. | 358/166 |
| 4,460,832 | 7/1984 | Bigham | 250/505.1 |
| 4,559,558 | 12/1985 | Hosoya et al. | 358/162 |
| 4,628,342 | 12/1986 | Desmons et al. | 358/10 |
| 4,641,963 | 2/1987 | Levine | 356/124.5 |
| 4,727,562 | 2/1988 | Belanger | 378/99 |
| 4,873,561 | 10/1989 | Wen | 357/24 |
| 4,951,141 | 8/1990 | Fischer | 348/187 |
| 4,972,451 | 11/1990 | Brok et al. | 378/207 |
| 5,164,978 | 11/1992 | Goodenough et al. | 378/207 |
| 5,191,621 | 3/1993 | Brok | 382/100 |
| 5,319,719 | 6/1994 | Nakazawa et al. | 382/6 |

*Primary Examiner*—Edward J. Glick
*Attorney, Agent, or Firm*—Perman & Green, LLP

[57] ABSTRACT

Charge coupled device X-ray sensor and camera capable of imaging with high modulation transfer function for high resolution. The high resolution is achieved by a method of simultaneously measuring the modulation transfer functions of x-ray and visible images while imaging the target or the scene. Then, by using the point spread function and measured MTFs at various spatial frequencies to calculating spatial frequency dependent correction table or correction parameters. This correction is applied to the raw image of the target inside a workstation using a software embodiment of the correction algorithm. The high precision, multi-spatial frequency patterns that are used in x-ray image correction are provided on the sensor, the scintillator screen and the fiber optic face plate of a sensor device to enable the user of the workstation to measure the modulation transfer functions (contrast transfer function) in the horizontal, vertical and in oblique orientations at several spatial frequencies.

8 Claims, 3 Drawing Sheets

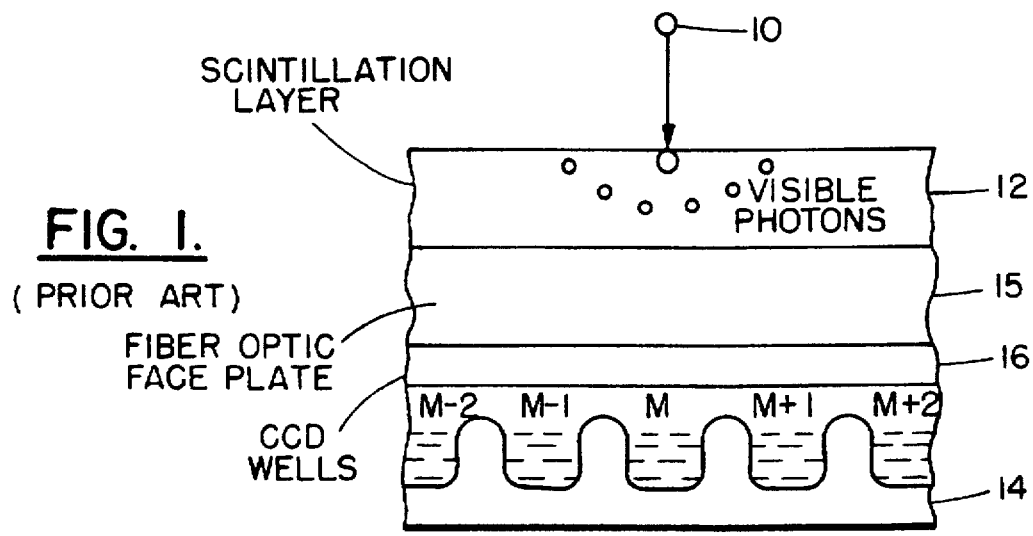
FIG. 1. (PRIOR ART)
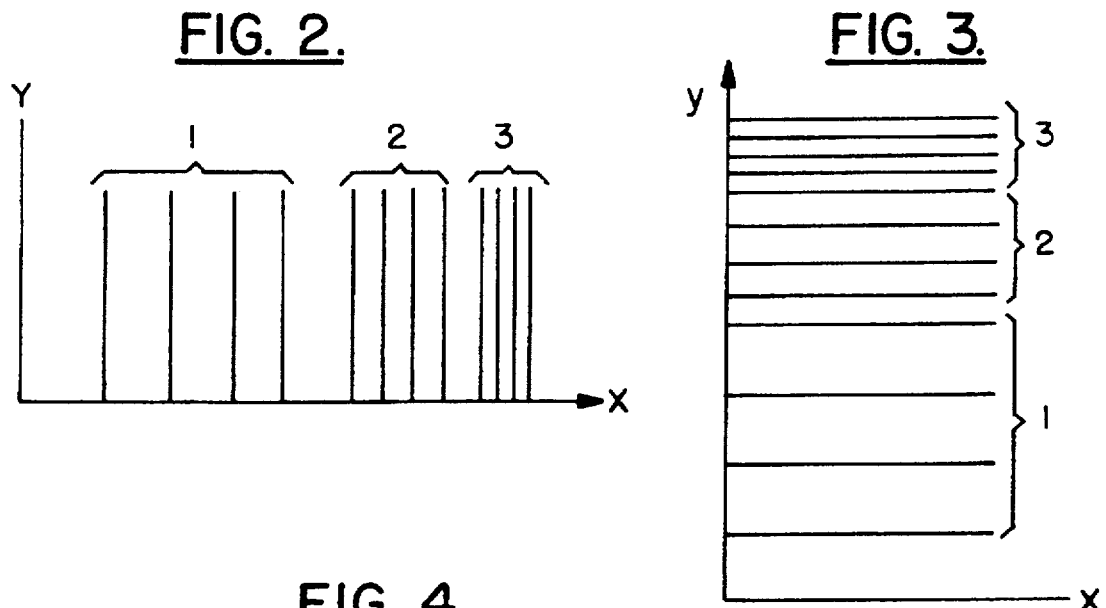
FIG. 2.
FIG. 3.
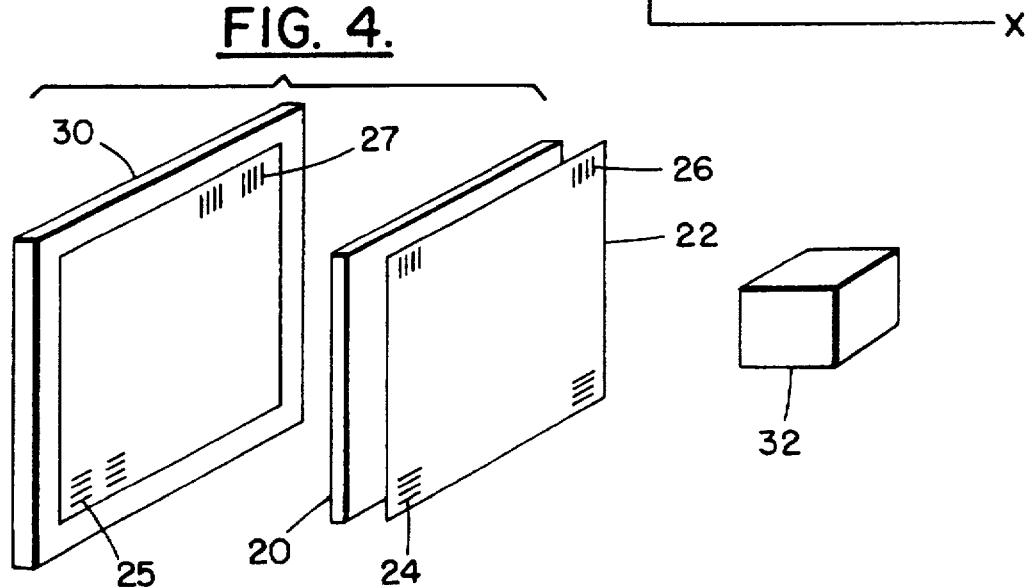
FIG. 4.

HIGH MODULATION TRANSFER FUNCTION CCD X-RAY IMAGE SENSOR APPARATUS AND METHOD

BACKGROUND OF THE INVENTION

1. Field of the Invention

The present invention relates to image sensing, and more particularly to imaging a selected test pattern located on the image receiver of a charge-coupled device x-ray sensor in two different photon energies and using the data to improve the image modulation transfer function (MTF) of the image in real time and provide a permanent record, electronically on the image, of the sensor performance during imaging.

2. Description of the Background Art

Modulation transfer and contrast transfers functions (MTF/CTF) in electronic x-ray sensors are typically low because of the light diffusion associated with x-ray detection in scintillation screens; i.e., by shadow imaging. Hence schemes for MTF/CTF improvements are necessary to achieve the required resolution level in medical applications to detect small cancer cells or fine cracks in teeth. This is illustrated in FIG. 1 which shows an x-ray photon 10 that impinges scintillation screen 12 which is disposed in front of fiber optic faceplate 15 and CCD chip 14 including CCD pixels 16 on a silicon substrate 18 wherein the generated electrons are disposed in the CCD potential wells 20.

The contrast between the target (i. e. cancer cell) and background is reduced by the scattering and diffusion between the scattered photons (off axis from the primary beam).

The reduced measured contrast $C_r$ is given by $$C_r = \frac{C}{1 + \frac{S}{P}}$$

where C is the actual contrast and S/P is the scattering ratio of the scattered photons and the photons of the primary beam.

The cause of the scattering is that the visible photons in a conventional screen must travel across the thickness of the screen layer 12 and hence experience diffusion in the layer. Hence the resolution (and MTF) of conventional scintillators is poor when used with CCD sensors 14.

The improvement in MTF provided by the present invention results in better sensor resolution and in a sensitivity improvement that allows the system to be x-ray photon shot noise limited up to high spatial frequencies, e.g., higher than 8 lp/mm and up to 15 lp/mm.

References relating to test images for sensing devices include the following patents.

U.S. Pat. No. 4,641,953 issued Feb. 10, 1987 to Levine entitled BACK-ILLUMINATED CCD IMAGER ADAPTED FOR CONTRAST TRANSFER FUNCTION MEASUREMENTS THEREON discloses a technique for using stripe patterns of varying spatial frequency, formed in the top-metallization of a back-illuminated solid-state imager to facilitate on-line measurement of contrast transfer function during waferprobe testing. The imager may be packaged to allow front-illumination during in-the-field testing after its manufacture.

U.S. Pat. No. 4,460,832 issued Jul. 17, 1984 to Bigham entitled ATTENUATOR FOR PROVIDING A TEST IMAGE FROM A RADIATION SOURCE discloses a nuclear radiation attenuator for providing a test image from a source of radiation is disclosed. The attenuator provides a test image including a plurality of discrete target images located in a background image. Each target image has an intensity that differs from the intensity background image to provide a target to background contrast ratio for each target image. A plurality of the target images each have a different contrast ratio so that the contrast ratios of the target simulate contrast ratios found in clinical testing. The attenuator provides a standardized test image that enables the performance of a scintillation camera to be test routinely.

References that relate generally to image enhancement include the following patents.

U.S. Pat. No. 5,319,791 issued Jun. 7, 1994 to Nakazawa et al. entitled PROCESSING APPARATUS FOR RADIOGRAPH IMAGE SIGNALS disclose an apparatus for processing radiographic image signals, including a photographing device for detecting an amount of radioactive rays transmitted through a subject and for converting the rays into original digital image signals in the form of pixels, and a signal processing circuit for processing the original digital image signals so as to decrease the amplitude of a low frequency component of the original digital image signals.

U.S. Pat. No. 4,559,558 issued Dec. 17, 1985 to Hosoya et al. entitled PICTURE QUALITY ADJUSTING CIRCUIT discloses a system, wherein, to improve picture quality, an input video signal is added to a correcting signal which is formed by the secondary differentiation of the input video signal. White peak current is reduced so that white blur is avoided without adversely affecting the picture quality on the black side.

U.S. Pat. No. 4,238,772 issued Dec. 9, 1980 to von Gierke et al. entitled IMAGE ENHANCEMENT USING ON-LINE SPATIAL FILTERING discloses a system wherein a scene is scanned line-by-line with a video camera transforming the spatial distribution of intensities present in the scene into a time-varying intensity function which is then filtered in real time. The time-varying function is passed through an electrical filter with adjustable passband and center frequency, and the filtered image is written on a storage tube or other suitable fast-memory array. The stored image which has been spatially filtered in the x direction is then scanned and read line-by-line (in the y direction) with the new scan lines perpendicular to the direction in which the image was written on the storage tube (or memory array). This transforms the spatial distribution of intensities on the storage tube (or memory array) into a time-varying function of intensities. This time-varying function is then passed through a second filter with adjustable passband and center frequency. The now doubly filtered image is displayed on a monitor, and represents the initial image spatially filtered on both x and y directions, with filter passbands and center frequencies chosen by the observer.

U.S. Pat. No. 4,074,231 issued Feb. 14, 1978 to Yajima et al. entitled PATTERN PROCESSING SYSTEM discloses a pattern processing system comprising a filtering processor which enhances the edge of a character signal picked up by an image pickup tube, a comparator which binary-codes the character signal on the basis of threshold values of two different levels, a circuit which provides the logical product between outputs from the filtering processor and the comparator, and a filtering processor which subjects the output of the circuit to a filtering processing by the use of a smoothing filter.

U.S. Pat. No. 3,980,819 issued Sep. 14, 1976 to Schwartz entitled EDGE ENHANCEMENT FOR TELEVISION IMAGES discloses apparatus for enhancing the edges of video images displayed on a cathode ray tube. The scanning velocity of the cathode ray tube electron beam is modulated so as to counteract the blurring effect which occurs when a video amplitude transition causes an increase in beam current and a corresponding increase in the size of electron beam spot at the screen of the cathode ray tube. When such a transition occurs, the beam is deflected in the direction of normal scan at a rate which corresponds to the rate of change in the size of the diameter of the spot so as to substantially arrest the spot edge, thereby causing a displayed video transition to have a better defined vertical edge. Horizontal edges of images are sharpened by auxiliary vertical deflection of the electron beam. Image edges are further improved by a video peaking scheme which eliminates the large spot size growth usually associated with large amplitude video transition which have been peaked.

References relates to modulation transfer function include the following patents.

U.S. Pat. No. 5,191,621 issued Mar. 2, 1993 to Brok entitled METHOD AND DEVICE FOR DETERMINING A MODULATION TRANSFER FUNCTION OF A DIGITAL IMAGING SYSTEM discloses a technique wherein to determine the asymmetry of the line spread function in digital imaging systems, two modulation-transfer functions are calculated by differentiation of the edge spread function followed by Fourier transformation. To that end a method is used in which a radiation intensity distribution spatially modulated by a series of equidistant elongated block elements in a test object is incident upon an input screen of a detector which is connected to a digital data processing device for storing detector signal values in memory locations which correspond to picture elements of the input screen. In the data processing device first values are derived by differentiating detector signal values for picture elements located along a picture line which extends across the series of block elements, and thereafter from positive and negative derivative values there is calculated by Fourier transformation respective two sequences of frequency-consecutive local maxima, from whose envelope the respective two modulation-transfer functions are determined.

U.S. Pat. No. 4,972,451 issued Nov. 20, 1990 to Brok et al. entitled METHOD OF DETERMINING A MODULATION TRANSFER FUNCTION OF A DIGITAL IMAGING SYSTEM discloses a technique wherein the modulation transfer function of a digital imaging system is measured using a test object comprising a number of slits. The effect of geometrical distortions on the MTF measurement, is minimized by making the dimension of the test object as small as possible with respect to the image detector. The minimum slit spacing d enabling suitable MTF measurement is expressed in the number of pixels N over a dimension L of the image detector: d>8L/N.

Other references, of collateral interest include the following patents.

U.S. Pat. No. 4,951,141 issued Aug. 21, 1990 to Fischer entitled METHOD OF DETERMINING THE TRANSMISSION FUNCTION OF A VIDEO CAMERA.

U.S. Pat. No. 4,873,561 issued Oct. 10, 1989 to Wen entitled HIGH DYNAMIC RANGE CHARGE-COUPLED-DEVICE.

U.S. Pat. No. 4,727,562 issued Feb. 21, 1988 to Belanger entitled MEASUREMENT OF SCATTER IN X-RAY IMAGING.

U.S. Pat. No. 4,628,342 issued Dec. 9, 1986 to Desmons et al. entitled OPTICAL TEST PATTERN FOR CORRECTING CONVERGENCE DEFECTS OF A COLOR CAMERA.

SUMMARY OF THE INVENTION

An object of the present invention is to provide an improved charge coupled device X-ray CCD sensor and camera capable of imaging with high modulation transfer function for high resolution. The high resolution is achieved by a method of simultaneously measuring the modulation transfer functions of x-ray and visible images while imaging the target or the scene. Then, by using the point spread function and measured MTFs at various spatial frequencies to calculating spatial frequency dependent correct table or correction parameters. This correction Kernel will be applied to the raw image of the target or the scene inside a workstation using a software embodiment of the correction algorithm. The workstation and the software are part of the camera of the present invention. The result is much higher degree of detail in the corrected image.

The present state of the art in x-ray scintillation screens is represented by the Min-R screen manufactured by Kodak. It is capable of 8% MTF at 8 lp/mm, which is less than the required level to detect the low tissue contrast for the x-ray energy of mammography (28 KV). The detection of low contrast is a critical performance factor for clinical applications.

Presently known improved scintillation screens are fabricated of CsI (cesium iodide) deposited glass (or directly on the CCD sensor). This cesium iodide layer is manufactured with columnar (fiber-like) growth of grains. The surfaces of these CsI fibers are doped with light absorbing material to create an isolation that prevents visible light diffusion that reduces MTF. The penalty paid for this technique is reduction in the light output with scintillation layer thickness. The reason for this light output reduction is due to increased absorption in the light absorbing material. In addition, MTF ultimately decreases with larger scintillation layer thickness because the CsI fibers are wider at the glass interface than at the top of the layer and hence light isolation is ineffective with thicker CsI film thickness.

It is therefore required to provide an MTF/CTF enhancement scheme using real time measurements on test patterns followed by appropriate digital signal processing algorithms.

BRIEF DESCRIPTION OF THE DRAWINGS

The above set forth and other features of the invention are made more apparent in the ensuing Detailed Description of the Invention when read in conjunction with the attache drawings, wherein:

FIG. 1 is a schematic illustration showing an x-ray photon directed onto an image sensor device.

FIG. 2 is a graphic illustration of an example of a horizontal MTF pattern.

FIG. 3 is a graphic illustration of an example of a vertical MTF pattern.

FIG. 4 is a perspective illustration of an embodiment of a CCD-X-ray sensor apparatus according to the principles of the present invention.

DESCRIPTION OF THE PREFERRED EMBODIMENT

Figure 5:
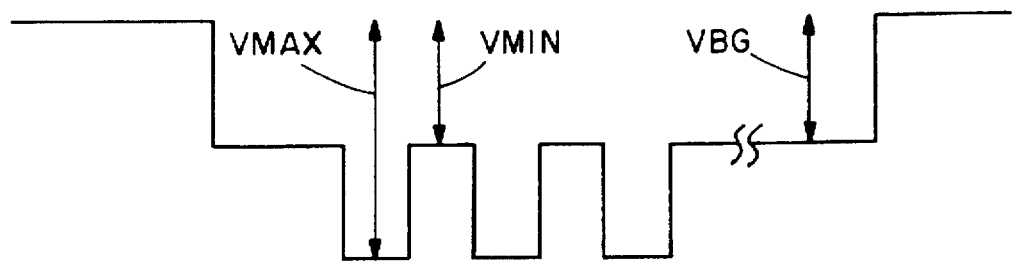
FIG. 5 is a graphic illustration of the video output waveform of the sensor in FIG. 4, relating to an image produced by the embodiment of the apparatus of FIG. 4.

It is known that x-ray images with higher modulation transfer function (MTF) can be produced using direct deposition of scintillation screens on radiation-hard CCDs or CMOS Sensors. In FIG. 1, a scintillation layer 12 is shown responsive to an X-ray photon 10 and layer 12 is disposed on fiber optic faceplate 15 which in turn is disposed on a radiation sensory device 14 including a layer 16 of CCD pixels wherein electrons are generated and disposed in CCD potential wells 20. In the present invention a more simple technique for enhancing MTF is achieved by using an external correction scheme, including hardware and software, which will recover some of the MTF losses in the x-ray conversion and coupling interfaces. One embodiment of the present invention uses the difference between the x-ray medical image and the visible shadow image of two identical patterns that are located on the sensor device to correct the x-ray medical image. The x-ray image of the pattern is created by an x-ray absorbing material, such as lead that is placed above the scintillation screen of the sensor device and is soft or has low MTF. The visible sharp image is created by imaging a pattern or group of patterns placed on the CCD sensor surface disposed below the fiber optic face place. The fiber optic face plate may supply illumination to the MTF pattern on the CCD surface or the light may be supplied by an external green, or other color light emitting diode illuminator or other sources of light. This is possible because the scintillation screen is partially transparent.

The high precision, multi-spatial frequency patterns that are used in x-ray image correction are provided on the sensor, the scintillator screen and the fiber optic face plate to enable the user of the workstation to measure the modulation transfer functions (contrast transfer function) in the horizontal, vertical and in oblique orientations at several spatial frequencies. The patterns placed above the scintillation screens can be made of lead-foil screens. The patterns place on the surface of the CCD Sensor may be manufactured by VLSI metal process, e.g., with Al or Al—Si or Al—Si—Cu, etc.

FIGS. 2 and 3 illustrate typical patterns to be located on the sensor device on the presentation invention.

Referring to FIG. 2, an example is illustrated of a horizontal MTF pattern using a group of four line pairs with increasing spatial frequency in the x direction is illustrated. FIG. 3 illustrates an example of a vertical MTF pattern using a group of four line pairs with increasing spatial frequency in the y direction. Both the line and the gap are scaled in each pattern.

Referring to FIG. 4, the elements of the sensor device are shown including the CCD sensor chip 30 which is shown as element 14 in FIG. 1, the scintillation screen 20 shown as layer 12 in FIG. 1, an x-ray absorbing element 22 such as a lead foil, and an optional light source 32. The scintillation screen 20 is actually located on a fiber optic faceplate which in turn is disposed on the CCD sensor chip 30 the same as as illustrated by fiber optic faceplate 15 on CCD pixels 16 and CCD chip 14 in FIG. 1, but is shown spaced apart in FIG. 4 for clarity. The lead foil 22 which may be 0.08 mm to 0.1 mm thick is either permanently mounted on scintillation screen 20 or calibrated by a separate exposure prior to acquiring the x-ray medical image. Lead foil 22 will carry variable spatial frequency bar patterns in both X and Y orientations such as XH-MTF pattern 24 and V-MTF pattern 26. The invention is not limited to the use of bar patterns. Other various hole patterns such as hole apertures and knife edges can be used. The spatial frequency of bar patterns 24 and 26 will vary between 2 and 15 Lp/mm. Optional patterns may be placed on the surface of the fiber optic face plate on sensor chip 30. The lead foil 22 thickness may be constant or variable to measure on order to correct MTF at various x-ray/exposure levels or variable contrast levels. Variable spatial frequency bar patterns 25 and 27 similar to patterns 24 and 26 are deposited on the upper surface of the CCD sensor chip 30. These patterns may be located on a foil similar to foil 22 described above or made of a metal layer in the VLSI manufacturing process. Using the same (simultaneous) exposure or sequential exposures, the CCD medical camera is operated in order to measure the medical target and the MTF of x-ray image and the visible image.

Measuring the MTF of the x-ray image is performed using the x-ray image of the patterns 24 and 26 of foil 22 on the scintillation screen 20. Measuring the MTF of the visual image is performed using the visual image of the patterns 25 and 27 placed on foil or metal layer 29 on the surface of the CCD sensor chip 30. These patterns are either illuminated by an optional external source 32 such as a green light emitting diode or other source or by light emitted by the scintillation screens.

The exact location of the patterns 24, 26, 25 and 27 depend on the required application of the x-ray CCD camera. For example, in an industrial application requiring the measurement of the size of a slit or a pinhole, then the patterns, together with rulers, are placed next to the area where the object will be imaged. The patterns deposited on the surface of the CCD sensor chip 30 are geometrically in perfect registration with the CCD pixels. This simplifies the CTF calculations. The patterns deposited on the surface of the scintillation screen 20 may be repeated at different locations with small displacements between the locations to simplify manual or automatic selection of a pattern which registers well with the underlying pixels to simplify CTF calculations.

Additional patterns to measure the point source modulation transfer function may be added in the form of an opaque lead ring disposed on the scintillation screen 20 with an inner diameter less than or equal to one or two pixels. Another advantage of utilizing these patterns is the generation of test images that allow the precise evaluation of the medical imaging equipment, i.e., by comparing the resolution obtained to that calculated using the test patterns at a first distance illuminated by an x-ray source at a second distance.

A CTF/MTF Correction Algorithm used in the present invention is discussed hereinbelow. Vertical and horizontal contrast transfer function (CTF) will be automatically determined (i.e., calculated by the work station) for the visible and x-ray images of the patterns 25 and 27 described above which are on the CCD sensorship and exposed simultaneously or separately from the medical image or target.

Figure 6:
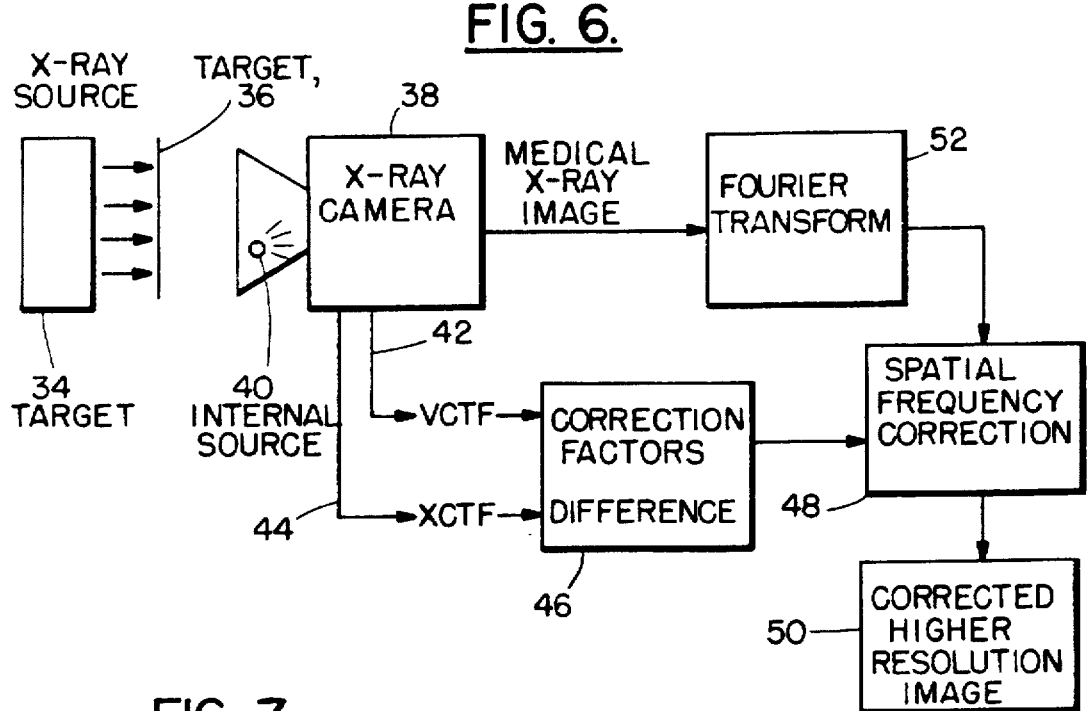
FIG. 6 is a schematic block diagram of an embodiment of a sensor system according to the principles of the present invention.

An embodiment of the workstation is illustrated in FIG. 6. An x-ray source 34 directs x-ray photons onto the target 36 and onto x-ray camera means 38 which is illuminated by internal source 40. The medical x-ray image signal from x-ray camera means 38 (including the CCD image sensor device at FIG. 4) is applied to Fourier transform processor means 52 while the vertical VCTF and the horizontal XCTF are measured and supplied in numbers on connections 42 and 44 to correction means 46. The output of the Fourier transform processor means 52 and the output of the correction means 46 are applied to spatial frequency correction algorithm means 48 which generates a corrected high resolution image which is applied to output means 50.

The CTF is calculated from the following equation:

$$CTF = \frac{VMAX - VMIN}{VMAX + VMIN - 2VBG} \times 100\%$$

Where:

VMAX=response to the gap pattern

VMIN=response to the bar pattern

VBG=X-ray background (transmission through the wide gaps in uniformly illuminated areas)

The relationships of VMAX, VMIN an VBG are illustrated in FIG. 5.

The CTF (or MTF will be measured at various spatial frequencies where:

XCTF($F_s$)=the CTF of the x-ray image at a spatial frequency $F_s$.

VCTF($F_s$)=the CTF of the visible image at a spatial frequency $F_s$.

In general, XCTF($F_s$)<VCTF($F_s$). The correction factors applied to the Fourier transform of the x-ray medical image spatial frequency correction algorithm means 50 are proportional to the difference between the two transfer functions:

VCTF($F_s$)-XCTF($F_s$).

Fourier transform for a one or two dimensional image can be expressed by the following series:

$$\text{(one dimension) } Vimage = V(x) = VBG + \sum_{X=0}^{n} V(x)\sin(F_s x)$$

$$\text{(two dimensions) } Vimage = VBG + \sum_{x=0}^{n}\sum_{y=0} V(x,y)\sin(F_s y)\sin(F_s x).$$

Where $F_s n$ represents the geometric Nyquist spatial sampling frequency of the imaging system.

Figure 7:
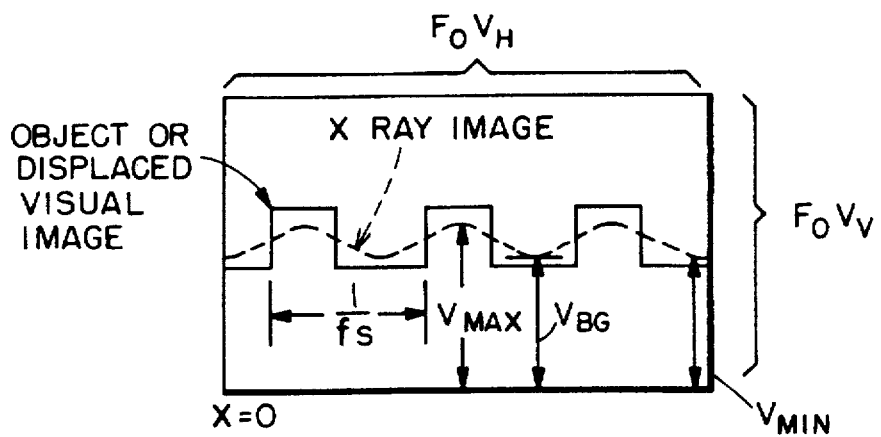
FIG. 7 and FIG. 8 are further illustrations of waveforms relating to the operation of the present invention.
Figure 8:
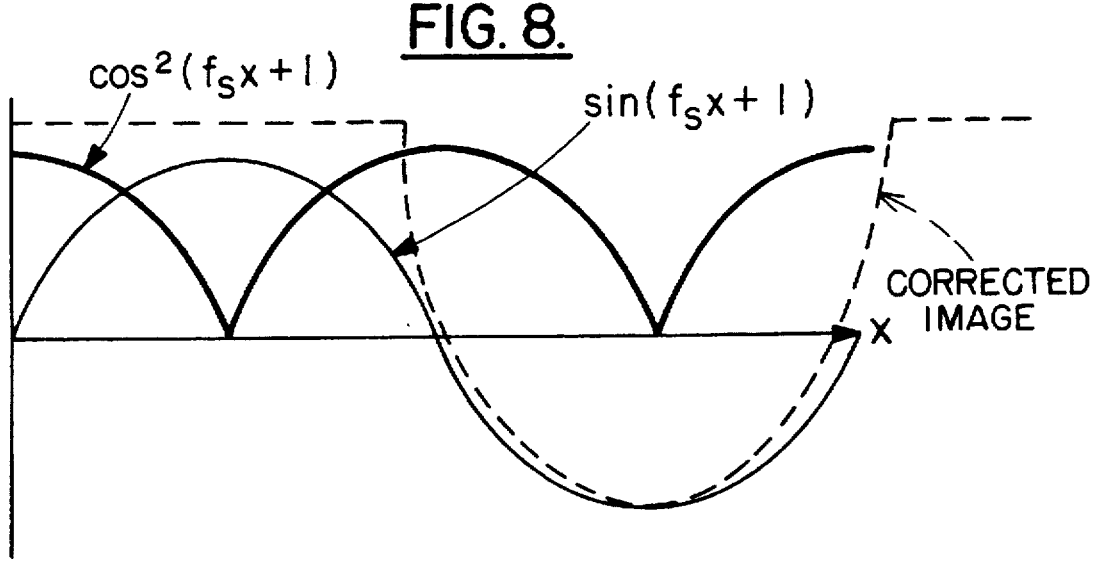

An example of a one dimensional correction algorithm is as follows, with reference to FIG. 7 and FIG. 8.

$$\text{Xray image} = VX = VBG + \frac{(VMAX - VMIN)}{2} +$$

$$\frac{(VMAX - VMIN)\sin(f_s x + \phi)}{2}$$

$$\text{CORRECTED Xray image} = VXC = VBG + \frac{(VMAX - VMIN)}{2} +$$

$$0.5 \frac{(VMAX - VMIN)}{1 - (VCTF - XCTF)} \sin(f_s X + \phi) +$$

$$\frac{a}{1 - (VCTF - XCTF)} \cos^2(f_s x + \phi)$$

For two dimensional image, a 2-D Fourier transform may be performed. The parameters of the transformed image will then be corrected by matrix multiplication with the correction matrices in the X and Y direction. The correction parameters may be different for each spatial frequency. The following equation represents the corrected image provided in output means 50:

$$[VXC] = [VBG] + \sum_{x=0}^{n}\sum_{y=0} [V(X,Y)][VCTF]\sin F_s x \sin F_s y$$

Other embodiments of the present invention may include x-ray sensors having scintillation layers using scintillation screens available in the art such as the Kodak Min-R screen, the Cesium iodide ($C_sI$) screen, the Gad O(T) screen and the florescent glass or doped glass fiber screen.

In the present invention, x-ray photon energies ranging from a few KeV to a few MeV may be used. Likewise, the present invention may employ MTF correction schemes for various effects induced by filters and micro lenses and diffractive optics patterns that are deposited on other visible and infrared imaging sensors, for example, polyamide dye filters or interference filters.

An example of the matrix multiplication for VMTF correction is as follows:

$$\begin{bmatrix} Vc1 \\ Vc2 \\ Vc3 \end{bmatrix} = \begin{bmatrix} 1 & -V_a & +V_b \\ -V_c & 1 & +V_d \\ V_e & -V_f & 1 \end{bmatrix} \begin{bmatrix} V1 \\ V2 \\ V3 \end{bmatrix}$$

where the VC 1-2-3 and V1-2-3 are the corrected and original pixels on a column which is three pixels high. Thus, the scintillation screen 12 may include a color filter, of a color filter screen may be used in place of a scintillation screen. In which case the degradations of MTF due to color crosstalk through the filter or the sensor structure can be estimated based on the MTF measurements performed on the patterns disposed above and below the filter layer. The MTF measurements are performed on both patterns and the results are used to correct the color crosstalk of the filter.

Figure 9:
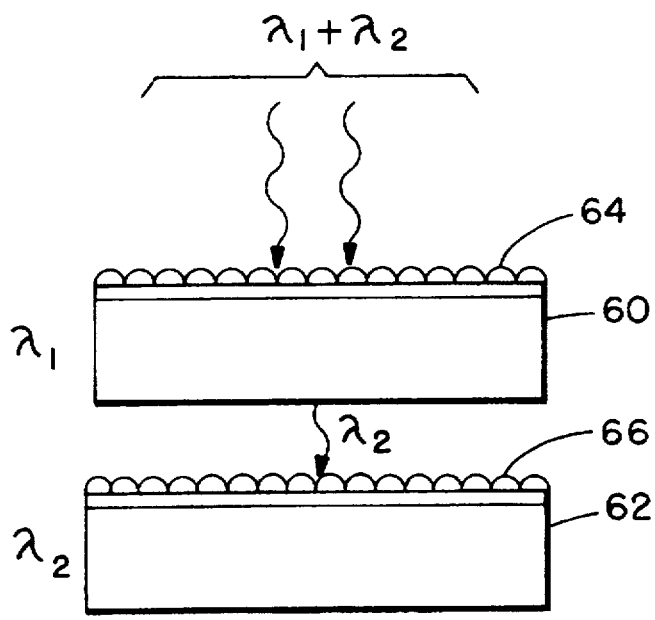
FIG. 9 is a schematic illustration of two cascaded sensors for detecting images in the visible and infrared bonds.

MTF correction schemes for the effects of cascading two sensors 60, 62 with MTF patterns 64,66 for wavelengths $\lambda_1$, and $\lambda_2$ along the optical axis, as shown in FIG. 9, the detected images in the spectral band $\lambda_1$ and $\lambda_2$ (i.e. visible and infrared).

The MTF correction process of the present invention includes the use of identical patterns that are placed (manually) in front of the x-ray sensor at equal distance to where the target will be placed during exposure and also placed at equal distance to the source as the position of its final target. That is, external patterns in addition to patterns in the focal plane array. These external patterns may be separated from the CCD focal plane array by the thick LUCITE plastic blocks of the system that function as partial absorbers to simulate propagation through the target such as the soft tissues of the breast in mammographic applications. The added patterns will include MTF patterns of varied spatial frequency, pin hole patterns and ruler and vernier patterns to measure pattern misalignments and target physical size.

What has been described is a high modulation transfer function CCD x-ray image sensor apparatus that is achieved by simultaneously measuring the modulation transfer functions of x-ray and visible image while imaging the target and using the measured modulation transfer functions at various spatial frequencies to calculate a spatial frequency dependent correction table or correction parameters. A target image is improved by using the correction table or parameters according to a correction algorithm.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. A high modulation transfer function CCD image sensor system comprising a charge-coupled device image sensing means having a radiation sensitive surface, a fiber optic faceplate disposed on the surface of said image sensing means, a scintillation screen disposed on said fiber optic faceplate, a radiation absorbing material disposed over said scintillation screen wherein said radiation absorbing material disposed over said scintillation screen contains a first variable frequency pattern disposed thereon on a first direction and a second variable frequency pattern disposed on said radiation absorbing material on said scintillation screen orthogonally to said first variable frequency pattern, and means for directing first wavelength radiation through said absorbing material and said first and second patterns, and onto said radiation sensitive surface of said charge-coupled device image sensing means to produce electrical signals representative of said first and second patterns, said CCD image sensor system further including a second radiation absorbing material disposed on the radiation sensitive surface of said charge-coupled device image sensing means, said second absorbing material having a third variable frequency pattern disposed thereon in a first direction and a fourth variable frequency pattern disposed thereon orthogonally to said third variable frequency pattern, means for directing second wavelength radiation through said second absorbing material and said third and fourth variable frequency patterns and onto said radiation sensitive surface of said charge-coupled device image sensing means to produce electrical signals representative of said third and fourth patterns.

2. A high modulation transfer function CCD image sensor system according to claim 1 wherein said second wavelength radiation is visible light wavelength radiation.

3. A high modulation transfer function CCD image sensor system according to claim 2 further including means for measuring and providing measurement signals for the modulation transfer function of the first and second and third and fourth variable frequency pattern signals of said charge-coupled device image sensing means.

4. A high modulation transfer function CCD image sensor system according to claim 3 wherein said first, second, third and fourth patterns are bar patterns.

5. A high modulation transfer function CCD image sensor system according to claim 3 further including digital signal correction means for providing a signal correction process of said signals from said measuring means for providing a corrected modulation transfer function.

6. A high modulation transfer function CCD image sensor device comprising a charge-coupled device image sensing means having a radiation sensitive surface, a fiber optic faceplate disposed on the surface of said image sensing means, a scintillation screen disposed on said fiber optic faceplate, first radiation absorbing material disposed over said scintillation screen wherein said radiation absorbing material disposed over said scintillation screen contains a first variable frequency bar pattern disposed thereon on a first direction and a second variable frequency pattern disposed on said radiation absorbing material on said scintillation screen orthogonally to said first variable frequency bar pattern, said first radiation absorbing material and said first and second patterns, and said radiation sensitive surface of said charge-coupled device image sensing means being responsive to first wavelength radiation for producing electrical signals representative of said first and second patterns and further including a second radiation absorbing material disposed on the radiation sensitive surface of said charge-coupled device image sensing means, said second radiation absorbing material having a third variable frequency pattern disposed thereon in a first direction and fourth variable frequency pattern disposed thereon orthogonally to said third variable frequency pattern, said second radiation absorbing material and said third and fourth variable frequency pattern and said radiation sensitive surface of said charge-coupled device image sensing means being responsive to second wavelength radiation for producing electrical signals representative of said third and fourth patterns.

7. A high modulation transfer function CCD image sensor device according to claim 6 wherein said second wavelength radiation is visible light wavelength radiation.

8. A high modulation transfer function CCD image sensor device according to claim 6 wherein said first wavelength radiation is X-ray wavelength radiation.

* * * * *